United States Patent

[11] 3,586,057

[72] Inventor Lucian T. Lambert
 Tulsa, Okla.
[21] Appl. No. 844,929
[22] Filed July 25, 1969
[45] Patented June 22, 1971
[73] Assignee William Basset
 Fayetteville, Ark.
 a part interest

[54] FLUID ACTUATED PIPELINE PATCH
 3 Claims, 2 Drawing Figs.
[52] U.S. Cl. .................................................... 138/99,
 285/18
[51] Int. Cl. ..................................................... F16l 55/16
[50] Field of Search ........................................... 138/97, 98,
 99; 285/18, 21

[56] References Cited
 UNITED STATES PATENTS
 3,480,043 11/1969 Proudfoot et al. ............ 138/99
 3,487,857 1/1970 Lee ............................. 138/99
 3,496,963 2/1970 Bardgette et al. ............ 138/99

Primary Examiner—Houston S. Bell, Jr.
Attorney—Head and Johnson

ABSTRACT: Pipe containing fluid under pressure is patched with a hydraulic ram which firmly draws a resilient pad with a metallic backing thereon tightly against the pipe over the hole thereby sealing same and permitting the metallic backing to be welded to the pipe.

PATENTED JUN22 1971 3,586,057
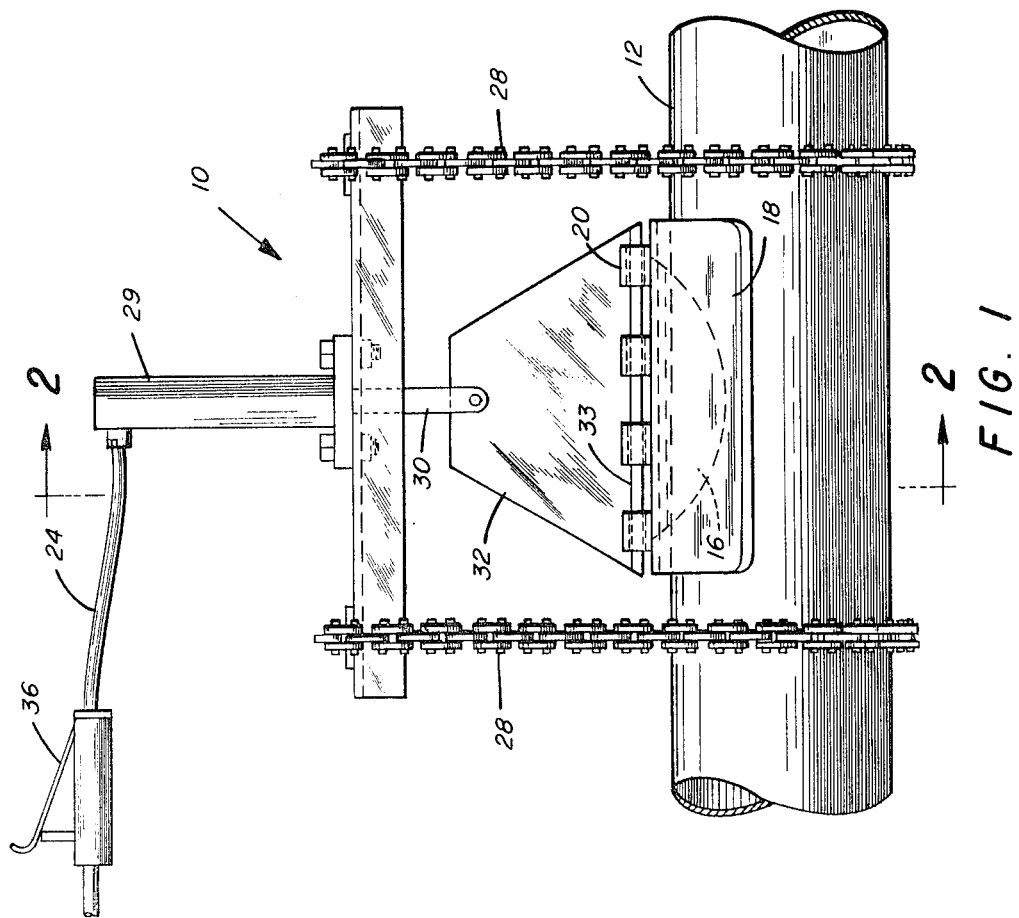
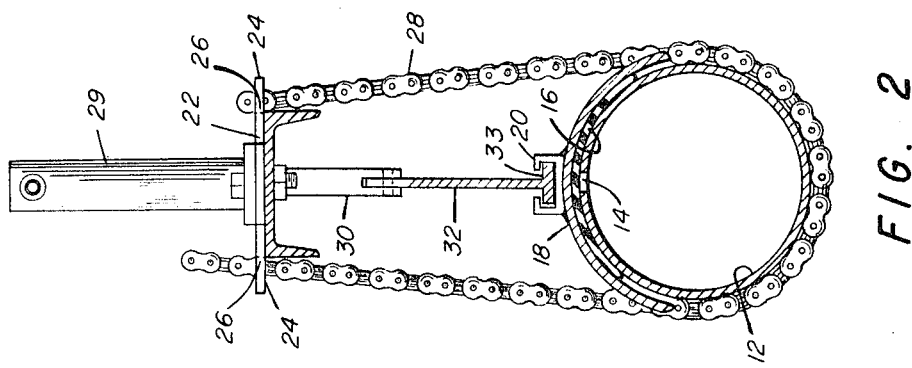
INVENTOR.
LUCIAN T. LAMBERT
BY
Head & Johnson
ATTORNEYS

FLUID ACTUATED PIPELINE PATCH

BACKGROUND OF THE INVENTION

This invention relates to a device for patching pipe and more particularly to a device for patching pipe which can be used on pipes containing fluid under pressure. Pipelines such as gas lines often develop leaks due to electrolysis or other defects. Due to the leakage of the gas a considerable fire hazard is incurred in repairing the pipe, especially if the pipe is to be repaired by welding.

Heretofore, the prior art has taught the repair of leaking pipes by placing a resilient pad with a metallic backing over the hole in the pipe and then to draw the pad firmly against the pipe by means of a tension screw passing through a plate which is held above the pad by means of chains wrapped around the pipe. This is shown in the following U.S. Pat. Nos.: 1,045,376; 1,617,812; 1,627,995; 2,581,015 and 3,043,342. The main disadvantage of these methods is the subjection of the repairmen to the hazards of the escaping gas during the considerable time period consumed in drawing the resilient pad tightly against the pipe by the manual rotation of the tension screw.

It is an object of this invention to provide a device whereby the resilient pad with the metallic backing thereon can quickly and easily be drawn tightly against the pipe.

It is another object of this invention to provide a device in which the resilient pad with a metallic backing is drawn tightly against a pipe over a hole therein by hydraulic means.

SUMMARY OF THE INVENTION

Generally the device consists of a resilient pad having a metallic backing shaped to conform with the outer curvature of a pipe; the resilient pad being placed over a hole in the pipe. A hydraulic ram, held above the resilient pad by means of chains wrapped around the pipe engages the metallic backing, presses the pad firmly against the pipe thereby sealing the hole and forcing the terminal edge of the metallic backing contiguous with the exterior wall of the pipe for welding thereto.

DESCRIPTION OF THE DRAWING

FIG. 1 is a side view of the invention fitted on a pipe.
FIG. 2 is a cross-sectional view of the invention taken along lines 2-2 of FIG. 1.

DETAILED DESCRIPTION OF THE PREFERRED EMBODIMENT

In describing the preferred embodiment of the invention specific terminology will be used for the sake of clarity. However, it is to be understood that the specific terms selected include all technical equivalents which operate in a similar manner to accomplish a similar purpose.

Looking at FIGS. 1 and 2 the apparatus 10 is shown fitted on a pipe 12 having a hole 14 therein. Positioned over the hole 14 is a resilient pad 16 having a metallic backing 18 concaved upwardly in cross section to conform to the outer curvature of the pipe. The periphery of metallic backing extends outwardly from the edge of the resilient pad and a plurality of tandem spaced horizontal C-shaped, ear segments 20 protrude upwardly from the longitudinal crown of the metallic backing 16.

Located above the pad 16 is a tension plate 22 having a lateral flange 24 along each side and an aperture centrally located therein. Each flange has two tandem spaced keyhole slots 26 transversely located therein, the slots in one flange being in alignment with a corresponding slot in the other flange. Engaging the slots and wrapped around the pipe are chain members 28 whereby the tension plate 16 is coupled to the pipe 12. Rigidly attached perpendicularly to the tension plate and extending upwardly over the aperture therein is a hydraulic or other pressure fluid cylinder 29 having a vertical operable ram 30 passing downwardly through the aperture. Vertically attached to the ram is a trapezoidal shaped pressure applicator member 32 having at its lower end a horizontal engagement portion 33 which slidably engages the C-shaped ear segments 20. Attached to the hydraulic cylinder is a conduit 34 and a valve 36 for actuation thereof.

In operation, the pressure applicator member 32 is slidably received onto the ear segments 20 and the apparatus 10 is placed over a hole in the pipe 12 and held thereto by the chains 28 which wrap around the pipe and are engaged in the key slots in the pressure plate 22. Upon actuation of the hydraulic cylinder, the plunger moves downwardly, drawing the resilient pad tightly against the hole thereby sealing the pipe and positioning the periphery of the metallic backing about the outer curvature of the pipe for welding thereto. After the welding is finished, the tension plate 16 can be removed from the pipe in an obvious manner.

If the repair of the pipe is to be only temporary, the hydraulic cylinder can be continually activated thereby sealing the leak and foregoing the necessity of welding the metallic backing to the pipe.

What I claim:
1. A repair device for pipes containing fluid under pressure and having a hole therein comprising:
    a resilient pad having a metallic backing thereon larger than said pad, said pad and metallic backing being concaved in cross section to conform to the outer curvature of said pipe and positionable on said pipe over said hole therein;
    a tension plate supportable above said pad and backing;
    flexible strap members adapted to encircle said pipe, the ends of said members retained by said tension plate;
    a pressure fluid actuated cylinder affixed to said tension plate and having a vertically operable ram releasably engaged with said backing; and
    means for energizing said cylinder whereby said ram draws said resilient pad tightly against said pipe, sealing said hole and retaining said backing to said pipe for welding thereto.
2. A repair device for pipes as in claim 1 wherein:
    said tension plate includes a flange member along each longitudinal edge thereof, each of said flange members having tandem spaced transverse keyhole slots therein;
    said flexible strap members are chains, adapted to encircle said pipe, one end of each chain being held in one of said slots on one of said flange members, the other end of each chain being held in one of said slots on said other flange.
3. A repair device for pipes as in claim 1 including a plurality of tandem spaced horizontal C-shaped ear segments protruding upwardly from the upper surface of said metallic backing and wherein said operable ram includes a vertical pressure applicator member having at the lower end thereof a horizontal engagement portion releasably engaged within said ear segments.